United States Patent [19]

Golden

[11] Patent Number: 5,001,193

[45] Date of Patent: Mar. 19, 1991

[54] EPOXY ADHESIVE FOR BONDING OF AUTOMOTIVE PARTS MADE FROM BULK OR SHEET MOLDING COMPOUND CONTAINING POLYMERIC TOUGHENING AGENT AND MANNICH BASE

[75] Inventor: Michael R. Golden, Bel Air, Md.

[73] Assignee: American Cyanamid, Conn.

[21] Appl. No.: 288,391

[22] Filed: Dec. 22, 1988

[51] Int. Cl.$^5$ ............................................. C08L 63/02
[52] U.S. Cl. ..................................................... 525/109
[58] Field of Search ........................................ 525/109

[56] References Cited

U.S. PATENT DOCUMENTS 4,803,232 2/1989 Shah .................................... 525/109

Primary Examiner—Earl Nielsen
Assistant Examiner—Frederick Krass
Attorney, Agent, or Firm—Steven Flynn

[57] ABSTRACT

Epoxy adhesives for bonding automotive parts, particularly those made of BMC of SMC, are improved by incorporating in the adhesive a Mannich Base having more than one primary or secondary amino groups.

2 Claims, No Drawings

EPOXY ADHESIVE FOR BONDING OF AUTOMOTIVE PARTS MADE FROM BULK OR SHEET MOLDING COMPOUND CONTAINING POLYMERIC TOUGHENING AGENT AND MANNICH BASE

The invention relates to high performance two part epoxy structural adhesives suitable for bonding plastics and composites, more particularly for bonding automotive sheet molding compound (SMC) and bulk molding compound (BMC). The adhesives exhibit excellent toughness, high temperature strength and rapid cure. They can be applied without surface treatment.

BMC and SMC are terms used in the art to describe fiber reinforced thermoset polyester molding materials. SMC is sheet material usually reinforced with glass fiber. BMC is bulk material reinforced with fiber strands. Automotive parts are molded from SMC usually by hot pressing and from BMC by hot pressing or injection molding.

Assembly of automotive SMC or BMC parts requires adhesives having special properties. Preferably the adhesive can bond well to surfaces which have not been pretreated. With some prior art adhesives a methylene chloride wipe was used to prepare the SMC surfaces for application of the adhesive. However, toxicological problems are making assemblers want to avoid the use of solvents. The adhesive must also have resistance to sag and especially so when the adhesive is applied rapidly by robots. This rapid application creates high shear rates which cause an adhesive to decrease in viscosity. However, when the shear is removed, the viscosity must be recovered almost instantaneously to maintain the original shape.

Due to the speed of automotive assembly operations, the adhesive must be able to build up strength rapidly. Green strength is defined as that point at which a bonded assembly is capable of being handled without movement of the bonded parts at the adhesive joint and retains the ability to cut off any excess of partially cured adhesive which may have squeezed out of the joints. A normal requirement is that the time to build green strength must be within 60 seconds at the cure temperature.

The adhesive must have sufficient heat resistance to withstand paint and ELPO cycles. In addition, as engine compartments become more compact, more heat will be generated under the hood. Bonded parts will need even more thermal resistance. Present technology provides for a lap shear strength of only 200 psi at 180° F. The present invention provides for an added factor of protection, giving lap shear strengths of over 300 psi at the same temperature and 200 psi at much higher temperatures.

In addition to the above mentioned processing requirements and thermal requirements, the adhesive must also comply with automotive specs regarding impacts, environmental exposures and cleavage.

By a new combination of ingredients the invention provides a two part epoxy adhesive capable of bonding automotive SMC and BMC joints rapidly. It meets all present automotive specs. Also, it provides excellent high temperature resistance along with excellent impact resistance. The adhesive also requires higher total energy to cleave an SMC plaque than the industry standard as tested by SAE test J1882.

The invention is an epoxy resin composition comprising:

a curable glycidyl ether epoxide group containing compound.

a liquid aliphatic polyamine having primary or secondary amino groups at least one of which is a terminal amino group.

a polymeric toughening agent capable of phase separation upon curing, a polyamide or an amidoamine or both and, a Mannich Base which provides for rapid cure and improved strength.

optionally, small amounts of phenol may be added to adjust cure speeds.

optionally inorganic fillers or particulates may be included to meet thixotropy requirements or for other purposes.

In preferred embodiments the adhesive of the present invention is supplied as a two part thixotropic paste. The two parts are mixed before application, then the mixed adhesive is applied to the surfaces to be bonded. The adhesive can be mixed and applied manually or by use of automatic metering, mixing and dispensing equipment.

In supplying the adhesive composition as a thixotropic two part paste, each part is supplied in a separate container. The parts then can be mixed before use when needed.

Ingredients of the first part comprise:
(a) 35-100 parts by weight of a compound containing at least one glycidyl ether epoxide group.
(b) 0-50 Parts by weight of particulate fillers,
(c) 0-9 Parts by weight of fumed silica thixotropes.

Depending on the epoxy used and the amount and types of fillers and thixotropes used, viscosity of the first part may be in the range from 100 cps to 100 million cps with a preferred range being 500 cps to 1 million cps.

Ingredients of the second part comprise:
(d) 15 to 40 parts by weight of a liquid aliphatic polyamine having primary or secondary amino groups at least one of which is a terminal amino group.
a polyamide or an amidoamine or a blend of both.
(e) 0-20 Parts by weight of an amine terminated curing agent,
(f) 5-20 Parts by weight of a Mannich Base,
(g) 0-50 Parts by weight of particulate fillers,
(h) 0-9 Parts by weight fumed silica thixotropes, and
(i) 5-50 parts by weight of a polymeric toughening agent capable of phase separation when cured.

In at least one of the parts, the adhesive composition of the invention further comprises:
(j) Optionally, 0-10 parts by weight of phenol.

Suitable viscosities for the second part usually will be in the range from 500 cps to 5 million cps, with a preferred range being 1000 cps to 1 million cps.

Epoxide group-containing materials useful in the compositions of the invention are glycidyl ether derivatives having an oxirane ring polymerizable by ring opening. Such materials, broadly called glycidyl ether epoxides, include monomeric epoxy compounds and epoxides of the polymeric type. We prefer to use epoxides having more than one epoxide group per molecule.

These epoxide group-containing materials can vary from low molecular weight monomeric materials to high molecular weight polymers and can vary in the nature of their backbone and substituent groups. Illustrative substituent groups include halogens, ethers, and siloxane groups. The molecular weight of the epoxy containing compound can vary from 150 to about 100,000 or more. Mixtures of various epoxy-containing materials can also be used in the composition of this invention. We prefer to use liquid epoxies having viscosity less than 500,000 cps and which are based upon an aromatic moiety.

Such epoxide group-containing materials are well known and include such epoxies as glycidyl ether type epoxy resins and the diglycidyl ethers of bisphenol A or bisphenol F and their higher molecular weight analogs.

There are a host of commercially available epoxies which can be used in this invention. In particular, epoxides which are readily available include diglycidyl ethers of bisphenol A (e.g., those available under the trade designations "Epon 828" or "DPL 862" available from Shell Chemical Co., and "DER-331", "DER-332", and DER "334" available from Dow Chemical Co.).

Another class of polymer polyepoxides which can be amine cured to make adhesives in accordance with the present invention includes the epoxy novolac resins obtained by reacting an epihalohydrin, such as epichlorohydrin, with the resinous condensate of an aldehyde, e.g. formaldehyde, and either a monohydric phenol or a polyhydric phenol.

Typical polyepoxides suitable in the practice of this invention include those disclosed in U.S. Pat. Nos. 2,500,600 and 3,245,483 which are incorporated herein by reference. Preferred in this invention are 1,2-epoxy compounds having an epoxide equivalence greater than 1.

Fillers which may be used in either of the two parts include talc, kaolin, silica, aluminum and other metal powders, metal oxides, calcium carbonate as well as pigments to impart certain colors as aids for mixing. As a thixotrope, a fumed silica such as one of those sold under the tradenames Cabosil or Aerosil may be used.

Suitable amidoamines can be any condensate of fatty acids with polyamines. Suitable fatty acids, for example include those based on animal or vegetable fats, usually containing 3 to 18 carbon atoms and may be saturated or unsaturated. Suitable amines to react with said fatty acids are any aliphatic or aromatic polyamines containing available primary or secondary amino groups. Many of these amidoamines are available commercially. Polyamides of use in this invention include condensates of dimers of the above mentioned fatty acids condensed with any of the above mentioned polyamines. Many of these suitable polyamides are commercially available.

Of particular value in accelerating the reaction rate of slower amidoamines and polyamides and of improving wettability of the SMC by the adhesive composition and thus improving wedge test results, are liquid aliphatic polyamines having primary or secondary amino groups at least one of which is a terminal amino group. These polyamines may be used separately or in mixtures. Suitable polyamines include: ethylenediamine, propylenediamine, butylenediamine, diethylenetriamine, piperazine, poly(alkylene-oxide)amines, diethyleneglycol diaminopropyl ether, 1,2-diaminocyclohexane, isophoronediamine, and diethyltoluenediamine.

Mannich Bases, as components of adhesive compositions in accordance with the invention, are of value in reducing cure times and they improve strength of the adhesive bond, particularly at temperatures above those that have been ordinarily used with SMC or BMC bonded parts. The Mannich reaction as it relates to this invention is the condensation of phenol or an alkylated phenol with formaldehyde and an amine. The amines for making Mannich Bases may be primary or secondary; they may be diamines or other polyamines. In the present invention we prefer to use as Mannich Base the reaction product of polyamines having a primary amino end group. Especially preferred are compounds of the formula

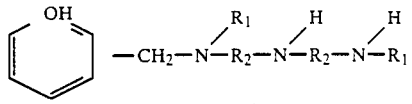

Wherein each $R_1$ may be either H or alkyl of one to three carbon atoms, and each $R_2$ may be alkylene of two to four carbon atoms. Preferably the amino end group is a primary amino group. The Mannich Base from the Mannich reaction of diethylene triamine is especially preferred.

A patent illustrating the Mannich reaction is U.S. Pat. No. 4,310,592 to Schmitz. There are many Mannich Bases commercially available.

Polymeric toughening agents which are useful are polymeric compounds which on curing of the adhesive form a discontinuous rubbery phase in the epoxy thermoset phase by phase separation. A preferred class of toughening agents for use in the invention are amine terminated butadiene acrylonitrile copolymers and these should be carried with the curing agents in the second part of the two part adhesive composition. Of particular value are amino terminated terpolymers of acrylonitrile, butadiene and styrene.

In the following examples, adhesive bonds were made by the following procedure. The epoxy and hardener components were mixed in the amounts described and the mixed adhesive composition was applied in a bead to a 4"×6" plaque of SMC with a thickness of 100 mils (0.1 inch). The SMC surface to be bonded had received no surface treatment other than wiping with a dry cloth. The thickness of adhesive application was controlled at 30 mils through the use of glass beads. Another plaque was placed over the first so as to provide a one inch overlap containing the adhesive. The resulting plaques were placed in a heated press at 250° F. under nominal pressure for 60 seconds to gel the adhesive, and then were post cured in an oven at 300° F. for 30 minutes. One inch strips were then cut from these cured plaques for use as bonded sample strips to be tested in both lap shear and side impact tests.

Wedge testing was done in accordance with SAE test J1882. After mixing the adhesive, it was applied to a 6×6 inch SMC plaque. The adhesive thickness was 30 mils and the bond area was 2×6 inches. The adhesive was cured as above. When the plaque cooled, a 45 degree wedge was driven through the plaques at a rate of 5 in/min. The wedge was attached to Instron tensile tester and each trial was recorded on chart paper.

EXAMPLE 1

The epoxy component was prepared by blending:

60 parts by weight of an epoxy resin based on the diglycidyl ether of Bisphenol A (molecular wt about 380), 37 parts by weight of talc and 3 parts by weight of fumed silica. This mixture was degassed under vacuum. This component is designated E1.

One hardener compound was prepared by compounding:

15 parts by weight of amine terminated butadiene-acrylonitrile copolymer (B. F. Goodrich), 14.4 parts by weight of polyamide resin (Versamid 140, Henkel Corp.), 8.8 parts by weight of an amidoamine (Ancamide 501, Pacific Anchor), 5.9 parts by weight of diethyleneglycol diaminopropyl ether (Ancamine 1922, Pacific Anchor), 11.8 parts by weight of a Mannich Base (Ancamine 1637, Pacific Anchor), 1.2 parts by weight of phenol, 40 parts by weight of talc, 2.9 parts by weight of fumed silica.

The mixture was degassed under vacuum and is designated H1.

EXAMPLE 2

Hardener H2 was prepared by compounding:

18 pbw amine terminated butadiene-acrylonitrile copolymer, 15 pbw Versamid 140, 6 pbw Ancamine 1922.

12 pbw Ancamine 1637, 46 pbw of silica and 3 pbw Cabosil.

The mixture was degassed under vacuum.

Hardener H3 was prepared the same as Hardener H2 except no Ancamine 1637 (the Mannich Base) was used and the weight of Ancomine 1922 was increased to 18 pbw.

Adhesive compositions were made by combining Epoxy E1 with each of the hardeners H1, H2 and H3 respectively. E1 was mixed in equal parts by volume with H1, and in equal parts by weight with H2 and H3. Each adhesive composition was applied to SMC plaques to make test samples as described above. Time to reach Green Strength in a press heated to 250° F., Lap Shear Strength, and wedge test results are shown in the Table.

TABLE

| Adhesive Mixture | Time to Green Strength Sec. | Lap Shear Strength psi at 180 F | Failure Mode |
|---|---|---|---|
| E1 + H1 | 60 sec | 300 | Failure in lamina |
| E1 + H2 | 60 sec | 400 | Failure in lamina |
| E1 + H3 | 90 sec | 300 | Failure at interface |

Results shown in the Table demonstrate the advantages gained in gel time, lap shear strength and bonding strength which are obtained by incorporating a Mannich Base in the thermosetting adhesive mixture. The increase in lap shear strength at 180° F. is an important improvement but equally important is that failure occurs in the lamina rather than the adhesive bond.

In addition to the properties demonstrated in the examples above, an adhesive according to the invention had excellent properties when tested under the environmental conditions required by automotive specification. The adhesive had excellent adhesion to every grade of automotive SMC evaluated. The rapid curing capability can consistently give bonds with green strength times of one minute or less. The adhesives also have excellent adhesion to steel surfaces.

We claim:

1. In an adhesive composition for bonding automotive sheet molding compound or bulk molding compound comprising:

a curable epoxy compound having more than one glycidyl ether epoxide group;

a polyamide or an amidoamine or both; and a liquid aliphatic polyamine having primary or secondary amino groups including at least one terminal amino group; and a polymeric toughening agent capable of phase separation on curing, and optionally particulate fillers and thixotropes, the improvement wherein said adhesive composition further comprises a compound of the formula wherein a Mannich Base is a compound of the formula

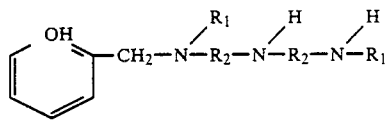

wherein each $R_1$ is either H or alkyl having one to three carbon atoms, and each $R_2$ is alkylene of two to four carbon atoms.

2. An epoxy adhesive composition in two parts which are combined for use, the first part comprising:

a curable epoxy compound having more than one glycidyl ether epoxide group, with particulate filler and thixotropes and the second part comprising:

a polyamide or an amidoamine or both, a liquid aliphatic polyamine having primary or secondary amino groups including at least one terminal amino group, an amino terminated polymeric toughening agent capable of phase separation on curing, and a compound of the formula

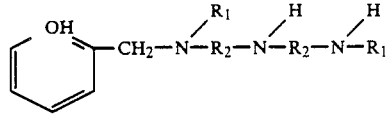

wherein each $R_1$ is either H or alkyl having one to three carbon atoms, and each $R_2$ is alkylene of two to four carbon atoms.

* * * * *